May 10, 1955  D. R. PARROTT  2,707,833
LIQUID LEVEL MEASURE
Filed March 29, 1954
Fig. 1
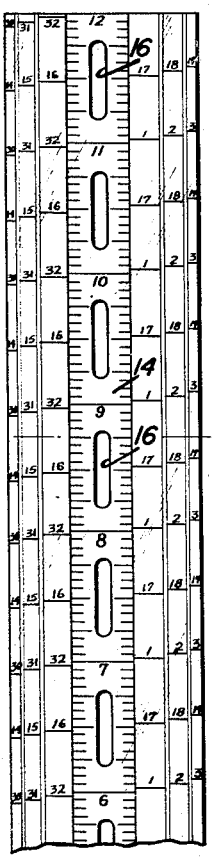
Fig. 2
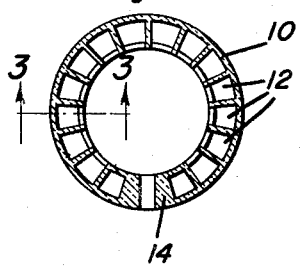
Fig. 3
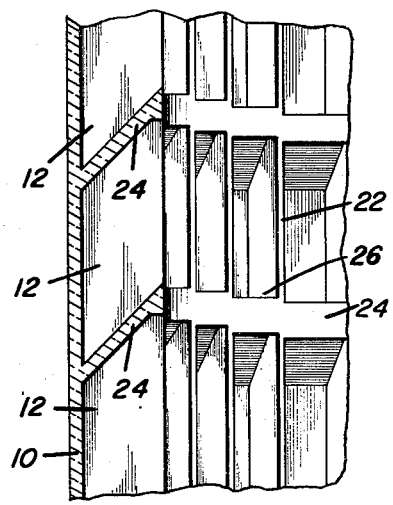
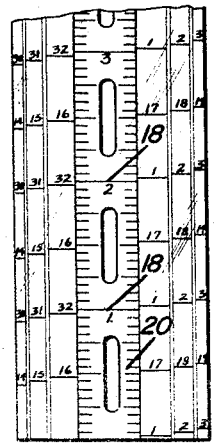
Fig. 4
Fig. 5
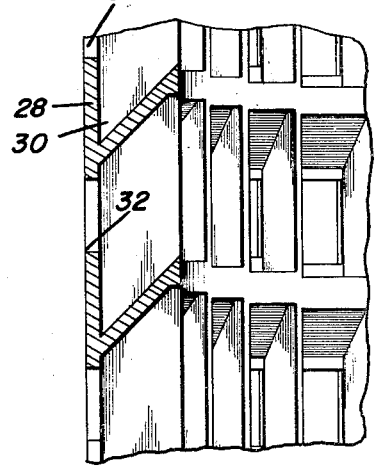
Dewey R. Parrott
INVENTOR.
BY
Attorneys

United States Patent Office 2,707,833
Patented May 10, 1955

2,707,833

LIQUID LEVEL MEASURE

Dewey R. Parrott, Newport, Ark.

Application March 29, 1954, Serial No. 419,318

2 Claims. (Cl. 33—126.4)

This invention relates to measuring devices and pertains more particularly to improvements in liquid measuring devices.

A primary object of this invention is to provide an improved liquid measuring device by means of which measurements may be very rapidly and accurately taken.

Another object of this invention is to provide an improved liquid measure which is light in weight, economical of construction and generally well adapted for the purposes intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing a measuring device constructed in accordance with this invention;

Figure 2 is a transverse horizontal section taken substantially along the plane of section line 2—2 of Figure 1;

Figure 3 is an enlarged vertical section taken substantially along the plane of section line 3—3 of Figure 2;

Figure 4 is an elevational view showing a portion of a modified form of measuring device; and Figure 5 is a vertical section taken substantially along the plane of section line 5—5 of Figure 4.

Referring now more particularly to the drawing, it will be seen that the measure consists essentially of the translucent tubular body member formed by the generally cylindrical wall 10 and which is formed on its inner surface with a plurality of cell-like pockets 12. A strip of material 14 extends longitudinally of the measure and this portion or strip is devoid of pockets but is provided at spaced intervals with elongated openings or slots 16 in the manner shown. The outer surface of this strip is also provided with gradations which, as shown, are marked off in any convenient units such as inches, feet or the like as designated by the longer lines 18 and in fractional parts of the units as indicated by the shorter lines 20.

As seen most clearly in Figure 3, the pockets are formed by the longitudinally extending wall portions 22 extending radially inwardly from the wall 10 and it is to be noted that each pocket is formed with a bottom wall portion 24 which slopes downwardly from the inner open side of the pocket toward the wall 10.

The pockets 12 are arranged in helical fashion or in upwardly spiralling relationship on the inner surface of the wall 10.

The number of pockets provided on the inner surface of the measure is dependent upon the accuracy which is desired in using the measure. For example, as shown in Figure 1, the units of measure are in inches and the small lines 20 designate gradations of 1/16 of an inch whereas there are a sufficient number of pockets formed on the measure to indicate one-thirty seconds gradations of fluid level. For this purpose, the upper edges 26 of the bottom walls 24 are disposed in upwardly stepped relation and each edge is positioned with respect to the indicia strip 14 such that the edge is just slightly below the proper gradation with which the cell or pocket is marked. To use the measure, it is merely inserted vertically into the liquid to be measured until its bottom portion touches the bottom of the container and the measure is then withdrawn and inspected to ascertain which is the uppermost pocket which contains fluid. Since the free edge of the bottom wall of this uppermost pocket is just slightly below its proper gradation mark, it will very rapidly apprise the observer that the liquid level is as is marked on the pocket. That is, it is not necessary to determine the level of fluid in the pocket merely to ascertain which uppermost pocket has received fluid.

Referring now more particularly to Figures 4 and 5, it will be seen that the measure shown in these figures is substantially the same as that previously described in that it embodies a wall 28 and pockets 30. However, in this case, the outer wall of each pocket is formed with an opening 32 establishing communication to the interior of the pocket in addition to the elongated slots 34 in the gradation strip 36.

In the form of the invention shown in Figures 1-3, the material must of necessity be formed of translucent or transparent material such that the existence of fluid within the pockets can be readily determined. However, in the form of the invention shown in Figures 4 and 5, although it is preferred, the measure need not necessarily be formed of translucent or transparent material inasmuch as the existence of liquid within the pockets may be determined through the openings 32. However, this is not the primary purpose of these openings inasmuch as they are provided for the purpose of quickly allowing the fluid to attain the proper level within the interior of the measure and also to prevent surging of the liquid which would result in improper and inaccurate readings on the measure. Of course, the slots in the gradation strips are ordinarily sufficient to prevent surging of the liquid but it will be readily appreciated that in some of the heavier liquids as is common in petroleum products it may be necessary to provide the additional openings on the outer surface of the main body wall portion of the measure.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A liquid measure comprising an elongated tubular member having a series of cell-like pockets formed on its inner surface and arranged in helical fashion thereon, each of said pockets having a sloping bottom wall, and said member being formed of translucent material whereby fluid disposed in said pockets may be readily observed.

2. A liquid measuring device comprising an elongated tubular body member having a plurality of cell-like pockets formed on its inner surface, each of said pockets having a sloping bottom wall, the inner free edges of said bottom walls being disposed in uniformly stepped relation, and said member being formed of translucent material whereby fluid disposed in said pockets may be easily observed.

References Cited in the file of this patent

UNITED STATES PATENTS

| 2,099,803 | Eynon | Nov. 23, 1937 |
| 2,343,168 | Bickle | Feb. 29, 1944 |
| 2,468,218 | Markham | Apr. 26, 1949 |